Patented Oct. 19, 1937

2,096,398

UNITED STATES PATENT OFFICE 2,096,398

METHOD OF PRODUCING INSULATING MATERIAL

George R. Hoover and Mildred McKim Hoover, Middletown, Ohio

No Drawing. Application February 5, 1936, Serial No. 62,550

5 Claims. (Cl. 106—18)

This invention relates to a porous and cellular composition of matter and to the method of the production thereof.

It is the object of the invention to produce a porous and sponge-like bituminous or resinous material by means of gas-producing micro-organisms which is particularly adapted for thermal insulating or sound-proofing purposes.

It is the object of the invention to produce a cellular or porous material from bituminous-pitch-type emulsions, dispersions or mixtures by bacterial action occasioned by the injection of living organisms or chemical ferments therein, such as molds, bacteria, yeast, enzymes or soluble ferments, whereby a product having improved heat and sound insulating properties is obtained. The bituminous material, suitably treated to cause bacterial fermentation, is transformed into a porous state by the generation of gas which finely subdivides the particles of material and which upon hardening results in a cellular material adaptable to many uses.

The bituminous-pitch-type material mentioned above may be prepared in accordance with the disclosures in the United States patents to Kirschbraun, No. 1,620,899, March 15, 1927, No. 1,733,497, October 29, 1929, and No. 1,734,437, November 5, 1929, which primarily relate to bitumens such as asphalts, hydrocarbons, pitches or resins dispersed in water with colloidal clay such as bentonite, with or without additional ingredients. The above-mentioned material is treated to undergo enzymic action and grows to a cellular state which upon drying results in a spongy mass filled with residual gas sealed in by a dry layer of emulsion.

The above composition of bitumen and fermentation-promoting agents may be applied in a plastic state before, during or after the fermentation action to any suitable backing in any manner known in the coating art such as by troweling, brushing or spraying upon metal, wood, brick, concrete, stone, paper, glass, etc., thereby producing valuable constructional materials. Whether the material be applied in a plastic state or in a solid state to any desired backing, such as sheet metal, a high degree of insulation against heat and sound is obtained.

The value of the product in accordance with the instant invention is far greater than that of known bituminous dispersions and emulsions. The substance obtained as disclosed herein is stable at temperatures up to 500° F. Under very high degrees of heat it will char, but will not burn or support combustion. It retains its flexibility at temperatures as low as —35° F. The material is water-proof and often it is used as a compound for sealing small openings in any type of structure. Thereby the insulating value of the material when applied to a wall is greatly increased for not only is the inherent insulating characteristics of the former availed of, but when it is applied to the wall in a plastic state, the small cracks and joints therein are sealed. Many insulating materials are known to have a high insulating value when kept comparatively dry; however if such materials are not completely water-proof, they decrease in insulating value if they become damp. The product according to this invention, being water-proof and in addition having a solid mantle upon the surface thereof which incases the spongy interior, permanently retains its insulating properties against heat and sound.

The invention may be realized in any desired manner by the use of a suitable base material which is subjected to bacterial action to generate a gaseous medium to effect a swelling or growth of the base material. As one example of obtaining a highly satisfactory product in accordance with the invention, a neutral or slightly alkaline bituminous emulsion is mixed with a small amount of sugar or other substance capable of supporting and promoting organic growth. The sugar may be added in water solution to facilitate mixing. However, this is not essential, since an aqueous emulsion of bitumen is capable of dissolving most sugars without the further addition of water. The mixture is then inoculated with the desired organism and is held at an optimum temperature for organic growth. Specifically, six ounces of a commercial grade of corn syrup were added to one gallon of a clay emulsion of asphaltic material as described in the above Kirschbraun patents together with one-half ounce of fresh yeast dissolved in two ounces of water. The whole mass was maintained at a temperature of 80° F. for eight hours, at the end of which time the yeast growth ceased. The bulk of the emulsion or dispersion had increased to three times its original size. The yeast bearing emulsion, when spread on a surface, as of a sheet of metal, and allowed to dry during the process of yeast growth, showed a uniform sponge-like structure resembling that found in sponge rubber. The surface of the mass was sealed due to the air drying of the surface. This surface is well adapted to the superposition thereupon of additional coatings of material of ornamental or other desired characteristics.

In lieu of yeast and sugar in conjunction with the base material, any other micro-organisms and nutrients therefor may be used, as long as these and the products therefrom do not affect deleteriously the base material.

A comparison of tests made with known bitumen emulsion and the same emulsion treated in the manner of the instant invention clearly emphasized the advantages of the latter. When a layer of bituminous emulsion ⅛″ thick was applied to a galvanized surface, and allowed to dry for 48 hours, an insulating value of 1.62 B. t. u. per inch thickness per square foot of sheet surface resulted. The same weight of treated bituminous emulsion applied in the same manner resulted in an insulating value of .32 B. t. u. per inch thickness per square foot of sheet surface, representing an increase of approximately 500% in insulating value.

It is understood that changes may be made in the composition of the base material as well as in the gas-producing fermenting agents.

While our invention has been described in detail, we do not wish to be limited to the specific materials and proportions which have been specified as exemplary, and we desire that only such limitations be imposed upon our invention as are set forth in the appended claims.

We claim:

1. The method of producing a porous material which comprises adding a fermentation-producing agent to an aqueous intimate dispersion of a bituminous material in clay to effect an aeration of the material and drying the material in its at least partially aerated state.

2. The method of producing a material having a cellular texture which comprises adding micro-organisms to an intimate dispersion of bitumen in bentonite to induce the production of gas and a rising of the dispersion and permitting the dispersion in its developed state to dry.

3. The method of producing a material having a porous texture which comprises inoculating an aqueous dispersion of bituminous material in clay with at least one compound causing the generation of gas by enzymic action, and drying the dispersion.

4. The method of producing an insulating material having a cellular texture which comprises adding a nutrient substance capable of supporting and promoting organic growth and a supply of micro-organisms to an intimate dispersion of bitumen in clay and water to effect a rising of the dispersion, and drying the dispersion.

5. The method of producing a porous insulating material which comprises adding a carbohydrate and yeast to an intimate aqueous dispersion of bitumen in bentonite to effect an aeration of the dispersion, and drying the aerated dispersion.

GEORGE R. HOOVER.
MILDRED McKIM HOOVER.